United States Patent [19]

Ito et al.

[11] 4,231,063
[45] Oct. 28, 1980

[54] FRAME SYNCHRONIZER HAVING A WRITE-INHIBIT CIRCUIT

[75] Inventors: Yutaka Ito; Yuzo Inoue; Takao Shimizu; Masao Inaba; Atsumi Sugimoto; Takeo Emori, all of Tokyo, Japan

[73] Assignee: Nippon Electric Co., Ltd., Tokyo, Japan

[21] Appl. No.: 39,321

[22] Filed: May 16, 1979

[30] Foreign Application Priority Data

May 19, 1978 [JP] Japan .................................. 53-60228

[51] Int. Cl.³ .................. H04N 5/04; H04N 5/22; H04N 9/46
[52] U.S. Cl. ..................................... 358/148; 358/181; 358/19
[58] Field of Search .................. 358/4, 8, 17, 19, 148, 358/149, 160, 180, 181, 183

[56] References Cited

U.S. PATENT DOCUMENTS

| | | | |
|---|---|---|---|
| 3,909,839 | 9/1975 | Inaba et al. | 358/8 |
| 4,007,486 | 2/1977 | Inaba et al. | 358/8 |
| 4,018,990 | 4/1977 | Long et al. | 358/19 |

OTHER PUBLICATIONS

Matley, "A Digital Framestore Synchronizer", *SMPTE Journal*, vol. 85, No. 6, pp. 385–388, Jun. 1976.
Kano et al., "Television Frame Synchronizer", *SMPTE Journal*, vol. 84, No. 3, pp. 129–134, Mar. 1975.

*Primary Examiner*—John C. Martin
*Attorney, Agent, or Firm*—Hopgood, Calimafde, Kalil, Blaustein & Lieberman

[57] ABSTRACT

A frame synchronizer for a television receiver in which the incoming television signal is digitized and stored in a memory, includes a circuit for generating a write-inhibit control signal for inhibiting the write-in of a digitized second television signal into the memory between the switchover from a first television signal to the second television signal and the beginning of a complete frame of the second television signal.

5 Claims, 10 Drawing Figures

FRAME SYNCHRONIZER HAVING A WRITE-INHIBIT CIRCUIT

The present invention relates generally to frame synchronizers and, more particularly, to a frame synchronizer having a write-inhibit circuit.

A frame synchronizer brings an incoming television signal into synchronism with a reference sychronizing signal as shown in U.S. Pat. Nos. 3,909,839 and 4,007,486. In such an apparatus, the incoming television signal is digitized and written in a memory in response to a write-in clock pulse that is synchronized with the incoming television signal. The read-out of the memory is carried out in response to a reference clock pulse, which is provided independently of the write-in clock pulse.

In this conventional frame synchronizer, the switchover at the input from a first incoming television signal to a second television signal, which is not synchronized with the first one (this switching is called non-synchronous switching), causes a disturbance of the second signal by the first signal at the output, because the write-in of the second signal is performed in response to the write-in clock pulse synchronized with the first signal. More specifically, because of the absence of synchronism between the write-in clock pulse and the second video signal during the transient period, the output of the memory can consist of components of both the first and second incoming signals.

Therefore, it is an object of the present invention to provide a frame synchronizer having a write-inhibit circuit capable of preventing a disturbance of this nature as occurs in the prior art frame synchronizers.

According to the present invention, a frame synchronizer having a write-inhibit circuit provides a write-inhibit control signal for inhibiting the write-in of the second input television signal from the moment of switchover to the beginning of a complete frame of the second input signal.

The features and advantages of the present invention will be understood from the following detailed description of preferred embodiments taken in conjunction with the accompanying drawings, wherein.

Figure 1:
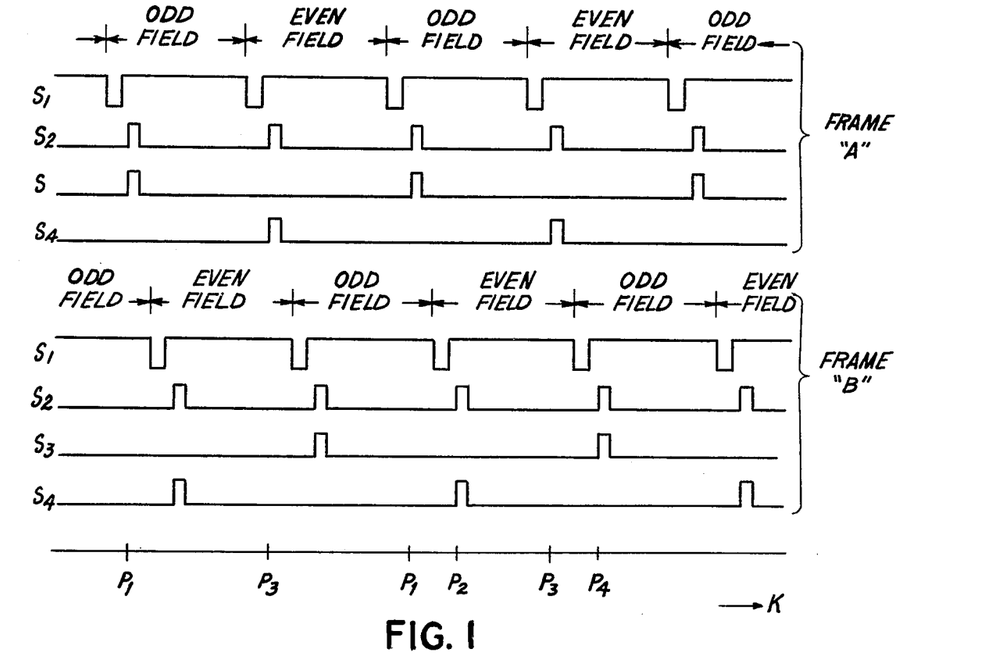
FIG. 1 is timing chart schematically illustrating the timing of the write-in operation performed in a frame synchronizer.

Referring now to FIG. 1, a signal $S_1$ represents a vertical synchronizing signal contained in an input television signal, and a signal $S_2$ represents a separated vertical synchronizing signal. A signal $S_3$ is a frame pulse representing the beginning of a frame, that is, the beginning of an odd field, and a signal $S_4$ is a pulse representing the beginning of an even field. Since a television signal is based on the interlaced scanning, the phase of a horizontal synchronizing signal is different by one half of a horizontal period between an odd field and an even field. Therefore, a vertical address counter on the write-in side of a frame synchronizer is cleared by the frame pulse $S_3$ at the beginning of every odd field, whereas it is cleared by a self-clear pulse produced by the counter itself at the beginning of every even field. The self-clear pulse is represented by the signal $S_4$.

Referring to FIG. 2(a), each of the rectangles marked "A" or "B" represents a television picture field, every two successive ones thereof constituting a frame. The transient frame undergoing the non-synchronous switching begins at time point $P_1$, with the switching command given at time point $P_2$ during the period of an odd field. Time point $P_3$, fixed with respect to time point $P_1$, is the time at which the self-clear pulse $S_4$ (FIG. 1) is generated. A complete frame "B" after switchover begins at time point $P_4$. In FIG. 2(b), the absence of the write-inhibit control causes a portion of the field "B" to be written in the frame memory immediately after the time point $P_2$. Accordingly, an irregular picture as shown in FIG. 2(b) is obtained at the output of the frame memory. In FIG. 2(c), which shows the write-inhibit applied during the period from time point $P_2$ to time point $P_4$, the picture at the output of the frame memory is free from the disturbance shown in FIG. 2(b).

Figure 3:
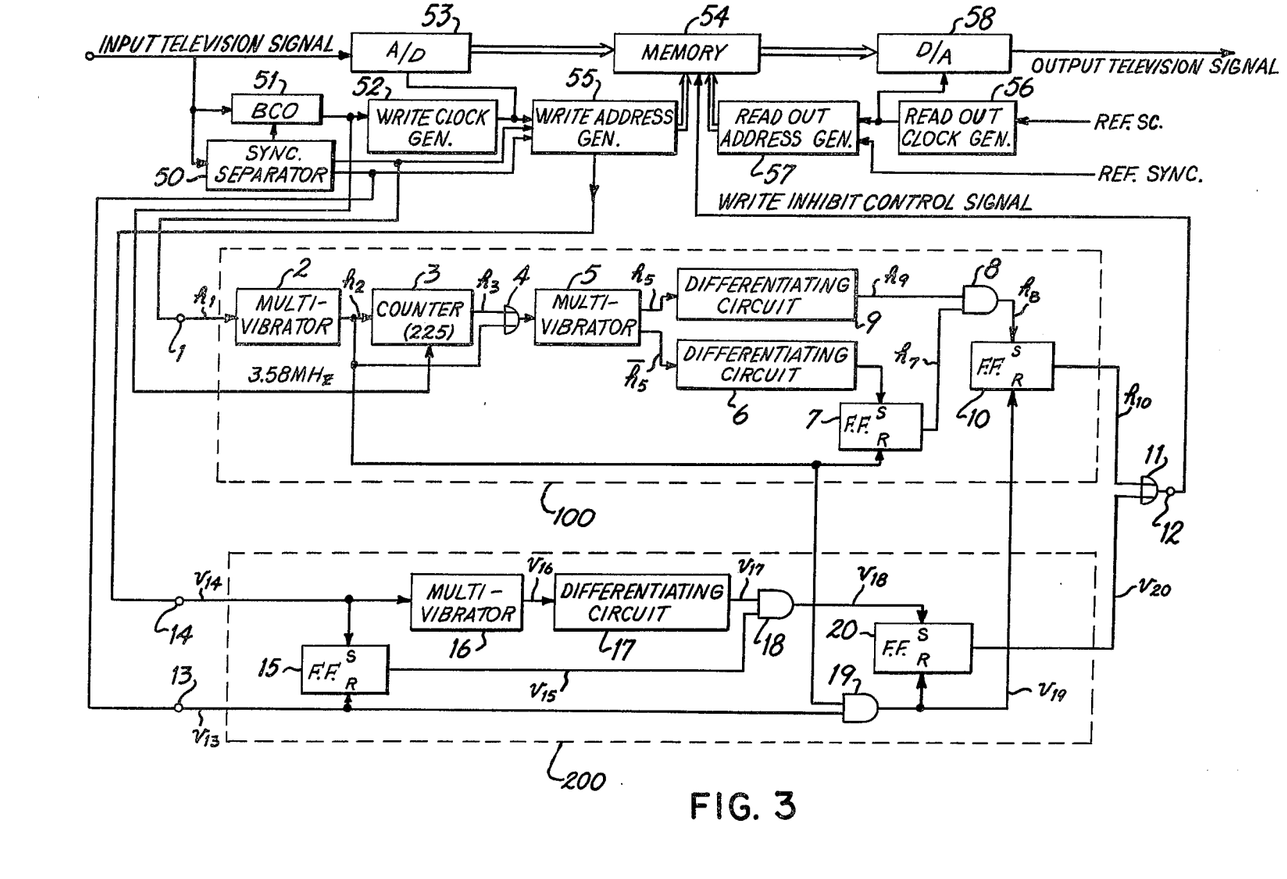
FIG. 3 is a block diagram illustrating a frame synchronizer according to a first preferred embodiment of the present invention.

With reference to FIG. 3, a frame synchronizer according to the present invention comprises a sync separator 50 for extracting a synchronizing signal from an input NTSC color television video signal, a burst-controlled oscillator (BCO) 51 for providing a 3.58 MHz color subcarrier synchronized with a color burst, and a write clock pulse generator 52 responsive to the output of the BCO 51 for generating write clock pulses at a rate of 10.74 MHz. An analog-to-digital (A/D) converter 53 receives the write clock pulses from pulse generator 52 and for converting in response to those clock pulses, the input video signal which is applied and stored in into a digital video signal, a memory 54. A write address generator 55 controls the write-in of the digitized video signal into the memory 54, and a read-out clock pulse generator 56 provides read-out clock pulses synchronized with a reference subcarrier (REF SC). A read-out address generator 57, which is coupled to the output of pulse generator 56, is responsive to a reference synchronizing signal (REF SYNC) and the read-out clock pulses for providing read-out addresses for the memory 54. A digital-to-analog (D/A) converter 58 converts the output of the memory 54 into an analog video signal. For further details of a frame synchronizer having such construction, reference is made to the above-mentioned U.S. patents.

The frame synchronizer according to this embodiment further comprises a first write-inhibit control signal generator 100 for producing a write-inhibit control signal $h_{10}$, upon the detection of the non-synchronous switching in response to a horizontal synchronizing signal $h_1$, and a second write-inhibit control signal generator 200 for producing another write-inhibit control signal $v_{20}$ upon the detection of the non-synchronous switching in response to a vertical synchronizing signal $v_{13}$. The first and second write-inhibit control signals $h_{10}$ and $v_{20}$ are fed to the memory 54 via an OR gate 11 to prevent the digitized video signal from being written into the memory 54.

Since the non-synchronous switching takes place at random, the interval of the neighbouring horizontal synchronizing pulses between which the switching takes place varies widely from almost zero to a value about twice as large as the horizontal synchronizing period. In the waveform diagram of FIG. 4(a), it is assumed that the switching-affected interval of the horizontal synchronizing pulse $h_1$ (output of sync separator 50) is smaller than the regular horizontal synchronizing pulse interval (63.5 micro-seconds), and in the waveform diagram of FIG. 4(b), it is assumed in FIG. 4(b) that the corresponding interval is greater than the regular interval.

Figure 4A:
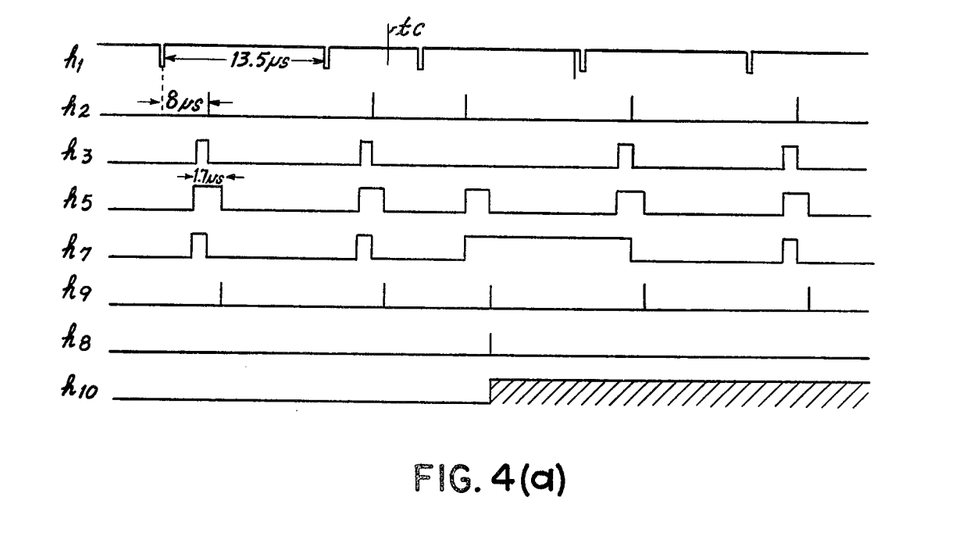
FIGS. 4(a) and 4(b) are waveform diagrams showing the operation of the embodiment of FIG. 3.

The first write-inhibit control signal generator 100 shown schematically in the block diagram of FIG. 3 will now be described with reference to the waveforms of FIGS. 4(a) and 4(b).

A horizontal synchronizing pulse $h_1$ fed to a terminal 1 is applied to a multivibrator in which is generated a clear pulse $h_2$ of a width of 30 nanoseconds that is delayed by about 8 microseconds with respect to the leading edge of the horizontal synchronizing pulse $h_1$. The 3.58 MHz output from the BCO51 synchronized with the color burst signal is applied to a counter 3 as a clock pulse. Also applied to the counter 3 is the output $h_2$ of the multivibrator 2 as a clear pulse therefor. The counter 3 outputs a pulse $h_3$ when it has counted 225 clock pulses. Accordingly, the pulse $h_3$ advances in phase by 2 or 3 subcarrier periods with respect to the clear pulse $h_2$. The clear pulse $h_2$ or the pulse $h_3$ is applied via an OR gate 4 to a multivibrator 5, which, in turn, generates a window pulse $h_5$ of 1.7 microseconds in width beginning at the leading edge of the pulse applied from the OR gate 4. An inverted output $\bar{h}_5$ of the window pulse $h_5$ is fed to a differentiating circuit 6, which provides a differentiated pulse at the leading edge of the inverted output $\bar{h}_5$, that is, at the leading edge of the window pulse $h_5$, and this differentiated pulse sets a flip-flop (F.F.) 7. The F.F. 7 is reset by the clear pulse $h_2$, and an output pulse $h_7$ from the F.F. 7 is applied to one of the input terminals of an AND gate 8. The window pulse $h_5$ is fed to another differentiating circuit 9, which provides a differentiated pulse $h_9$ at the leading edge of the window pulse $h_5$, and supplies it to the other of the input terminals of the AND gate 8. The output pulse $h_8$ from the AND gate 8 represents the detection of the non-synchronous switching. The pulse $h_8$ is fed to an F.F. 10 to bring it to a set state. Accordingly, the F.F. 10 outputs a write-inhibit control signal $h_{10}$ until it is reset by a frame pulse $v_{19}$ representing the beginning of a frame (as will be explained later). Since it is assumed in FIG. 4(a) that the switching-affected interval between the two succeeding horizontal synchronizing pulses $h_1$ with the non-synchronous switching time point $t_c$ interposed therebetween is smaller than the regular horizontal synchronizing pulse interval, one of the pulses $h_3$ is lost after the non-synchronous switching. Consequently, in the F.F. 7, the timing for resetting is delayed until the next clear pulse $h_2$ is applied. Hence, a broadwidth output pulse $h_7$ is provided from the F.F. 7. At the AND gate 8, the AND condition between the pulse $h_7$ and the pulse $h_9$ is thus fulfilled thereby to provide an output representing the detection of the non-synchronous switching.

Figure 4B:
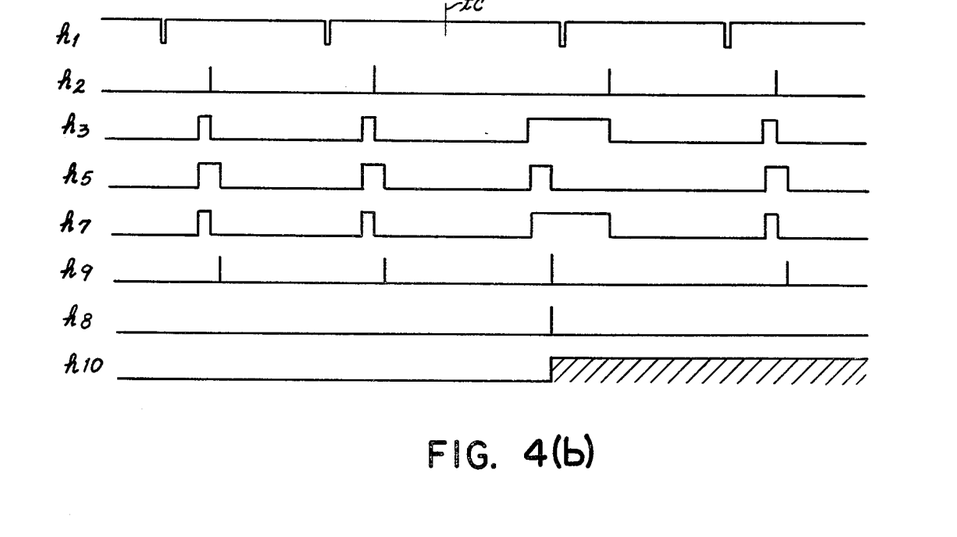

As noted previously it is assumed in the waveform diagram of FIG. 4(b) that the interval between the switching-affected horizontal synchronizing pulse interval with the time point $t_c$ interposed therein is greater than the regular horizontal synchronizing pulses $h_1$. In this example, after the counter 3 has counted 225 subcarrier pulses until the appearance of the next subsequent clear pulse $h_2$, the broad-width portion of the output pulse $h_7$ is obtained from the F.F. 7. As in the case of FIG. 4(b), the AND condition between the pulses $h_7$ and $h_9$ is fulfilled at the AND gate 8, thereby to provide the output representing the detection of the non-synchronous switching.

When the switching-affected interval is approximately equal to the regular horizontal synchronizing pulse interval, the non-synchronous switching cannot be detected with the first write-inhibit control signal generator 100. In this case, detection of the non-synchronous switching is effected with the second write-inhibit control signal generator 200.

In the following description of the second write-inhibit control signal generator 200 with reference to FIGS. 5(a) and 5(b), it is assumed in FIG. 5(a) that the switching-affected interval between the two succeeding vertical synchronizing pulses with the switching time point $t_c$ interposed therebetween is smaller than the regular vertical synchronizing pulse interval. Similarly, it is assumed in FIG. 5(b) that the switching-affected interval is greater than the regular vertical synchronizing pulse interval. A separated vertical synchronizing signal $v_{13}$, which has been obtained from a vertical synchronizing signal $v_1$, is applied to a terminal 13, and a vertical end pulse $v_{14}$ generated from the write address generator 55 is applied to a terminal 14. The vertical end pulse $v_{14}$ is produced when a vertical address counter in the write address generator 55 (to be described later), starting from zero, has counted up 255 pulses. The vertical end pulse appears during the vertical blanking period. The F.F. 15 is set in response to the leading edge of the vertical end pulse $v_{14}$ and is reset at the leading edge of the pulse $v_{13}$. A multivibrator 16 produces a window pulse $v_{16}$ of about 250 microseconds in width beginning at the leading edge of the vertical end pulse $v_{14}$. A differentiating circuit 17 differentiates the window pulse $v_{16}$ to provide a differentiated pulse $v_{17}$, which is then applied to an AND gate 18. Responsive to the pulse $v_{17}$ and the output pulse $v_{15}$ of the F.F. 15, the AND gate 18 provides an AND output, which is representative of the detection of the non-synchronous switching. The output $v_{18}$ of the AND gate 18 sets an F.F. 20. An AND gate 19 provides an AND output between the clear pulse $h_2$ from the first write-inhibit control signal generator 100 and the synchronizing signal $v_{13}$ to produce a frame pulse $v_{19}$ representative of the beginning of a frame. The pulse $v_{19}$ is fed to the F.F. 20 and the F.F. 10 to reset these flip-flops. The output $v_{20}$ of the F.F. 20 is fed to the OR gate 11 as a write-inhibit control signal.

As described previously, the phases of the vertical synchronizing pulses and the horizontal synchronizing pulses are different by one half of the horizontal synchronizing pulse period between an odd field and an even field. Hence, if a pulse having a predetermined width is produced as the vertical synchronizing signal $v_{13}$, then the frame pulse $v_{19}$ can be easily produced.

Figure 5A:
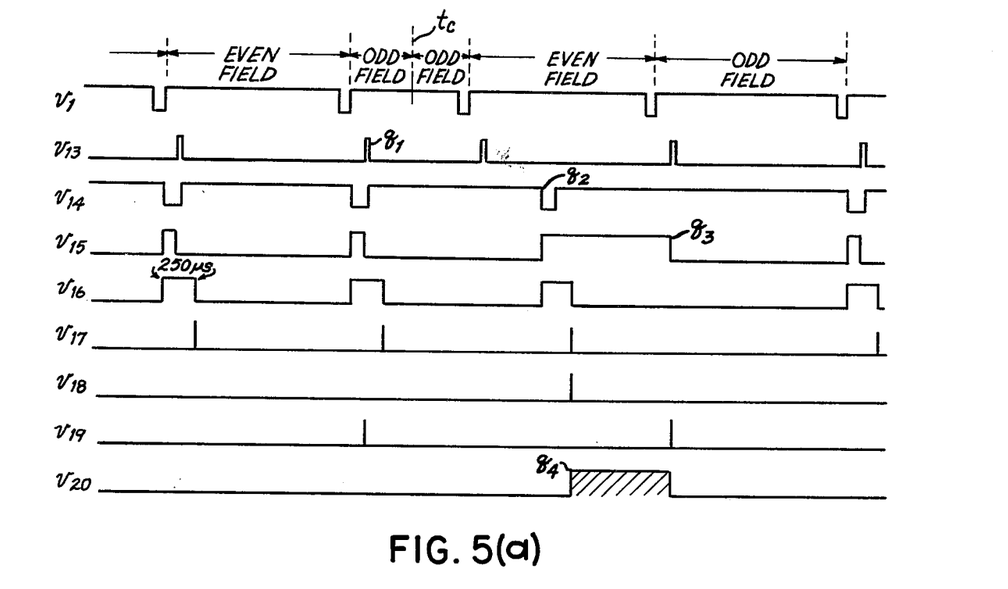
FIGS. 5(a) and 5(b) show another set of waveform diagrams showing the operation of the embodiment of FIG. 3.

Referring further to FIG. 5(a), with the vertical end pulse $v_{14}$ taken into account, a frame begins at a time point $q_1$ after the vertical address counter has been cleared at this time point, with a self-clear pulse appearing at a time point $q_2$. Once set at the time point $q_2$, the F.F. 15 is not reset until a time point $q_3$, when the next one of the vertical synchronizing signal pulse $v_{13}$ appears. Thus, a wide pulse extending from the time point $q_2$ to the time point $q_3$ is produced as an output pulse $v_{15}$. In addition, the differentiating circuit 17 provides a differentiated pulse $v_{17}$ about 250 microseconds after the leading edge of the vertical end pulse $v_{14}$. The pulse $v_{17}$ and the output pulse $v_{15}$ from the F.F. 15 are supplied to the AND gate 18 to provide an AND output representative of the non-synchronous switching. Thus, a write-inhibit control signal $v_{20}$ extending from the time point $q_4$ to the time point $q_3$ is produced.

Figure 5B:
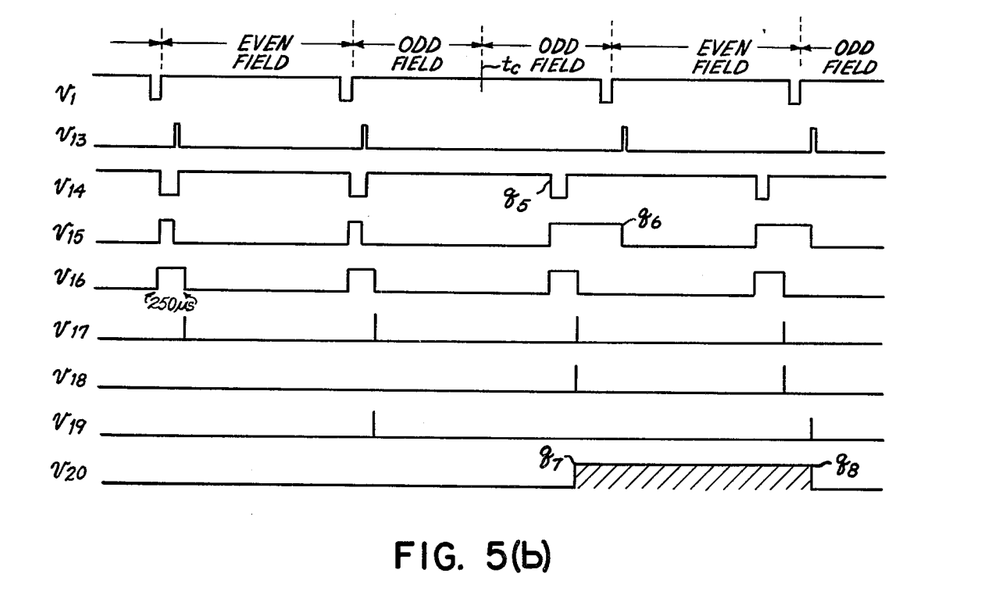

In FIG. 5(b) also, the F.F. 15 is set at a time point $q_5$ and reset at time point $q_6$, so that a broad-width pulse $v_{15}$ is generated from the F.F. 15, thereby to provide a pulse representative of the non-synchronous switching similarly to the case illustrated in FIG. 5(a). Then, a write-inhibit control signal $v_{20}$ is produced over the period from a time point $q_7$ to a time point $q_8$.

The output $h_{10}$ from the first write-inhibit control signal generator 100 and the output $v_{20}$ from the second write-inhibit control signal generator 200 are fed via the OR gate 11 and the terminal 12, to the memory 54 as the write-inhibit control signal.

Most non-synchronous switching is detected by the control signal generator 100. If the control signal generator 100 fails to detect non-synchronous switching as described previously, the second write-inhibit control signal generator 200 is ready to detect it. Although there is a slight possibility that neither of the generators 100 and 200 can detect the non-synchronous switching, as in the case where the non-synchronous switching has taken place at the end of an even field of the first television signal in coincidence with the beginning of the even field of the second television signal, such possibility is negligibly small.

If the input television signal contains noise that is comparable in magnitude to the synchronizing signal, the detection of the non-synchronous switching may be driven out of normal operation. However, since the noise practically is pulsive, the reliability of the detection of the non-synchronous switching is maintained by the use of a noise eliminating circuit, such as the noise eliminating circuit 300 shown in FIG. 6, which is adapted to be provided at the stage preceding the first write-inhibit control signal generator 100 of FIG. 3.

Figure 6:
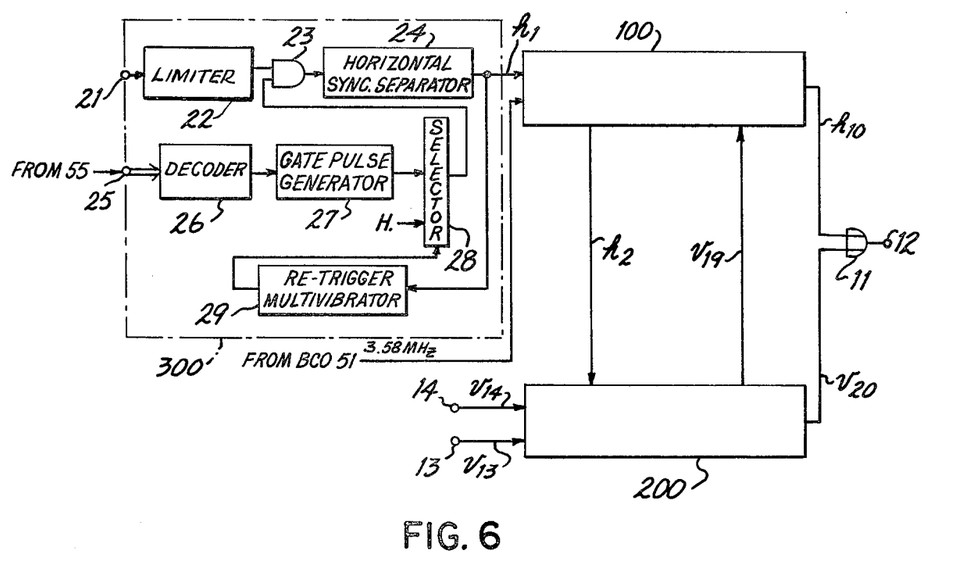
FIG. 6 is a block diagram illustrating a modification of the embodiment of FIG. 3.

In the noise eliminating circuit 300, the input television signal is fed through a terminal 21. That portion of the input signal which corresponds to the horizontal synchronizing pulses is amplitude-limited at a limiter 22. The output of the limiter 22 thus contains vertical and horizontal synchronizing pulses with their amplitudes limited. The same output is fed via an AND gate 23 to a horizontal sync separator 24, which provides the horizontal synchronizng pulses $h_1$. On the other hand, an address output from a horizontal address counter (to be described later) in the write address generator 55 (FIG. 3) is fed to the decoder 26 through a terminal 25. While one horizontal period is defined to be equal to 227 or 228 subcarrier periods, when the address output takes a value corresponding to about 220 subcarrier periods, the decoder 26 generates a decoded address signal. In a gate pulse generator 27, a gate pulse of about 2 microseconds in width synchronized with the decoded address signal from the decoder 26 is provided, which pulse corresponds to the position of the next synchronizing signal pulse. This gate pulse is fed to a selector 28, to which is also applied a high level output H having a fixed value, and either one of these signals is selectively applied to the AND gate 23. Ordinarily, the selector 28 applies the gate pulse to the AND gate 23 to eliminate a noise existing not in coincidence with the synchronizing signal. However, when the non-synchronous switching has occurred, the interval between the two neighboring horizontal synchronizing pulses with the non-synchronous switching time point interposed therebetween is varied. Therefore, the gate pulse is not always applied to the AND gate 23. To ensure the supply of the gate pulse to the AND gate 23, a re-trigger multivibrator 29 is provided which has a re-trigger period of, for example, 70 microseconds greater than the horizontal synchronizing signal period of 63.5 $\mu$s, and which is triggered by the horizontal synchronizing signal $h_1$. Therefore, when the interval between the incoming separated horizontal synchronizing signal pulses $h_1$ becomes 70 $\mu$s, or longer, the output of the re-trigger multivibrator 29 is inverted in polarity, so that the signal selected by the selector 28 is transferred from the gate pulse to the high-level output H of fixed value. When the high-level output H of fixed value is selected by the selector 28, the noise eliminating operation is cancelled.

Figure 7:
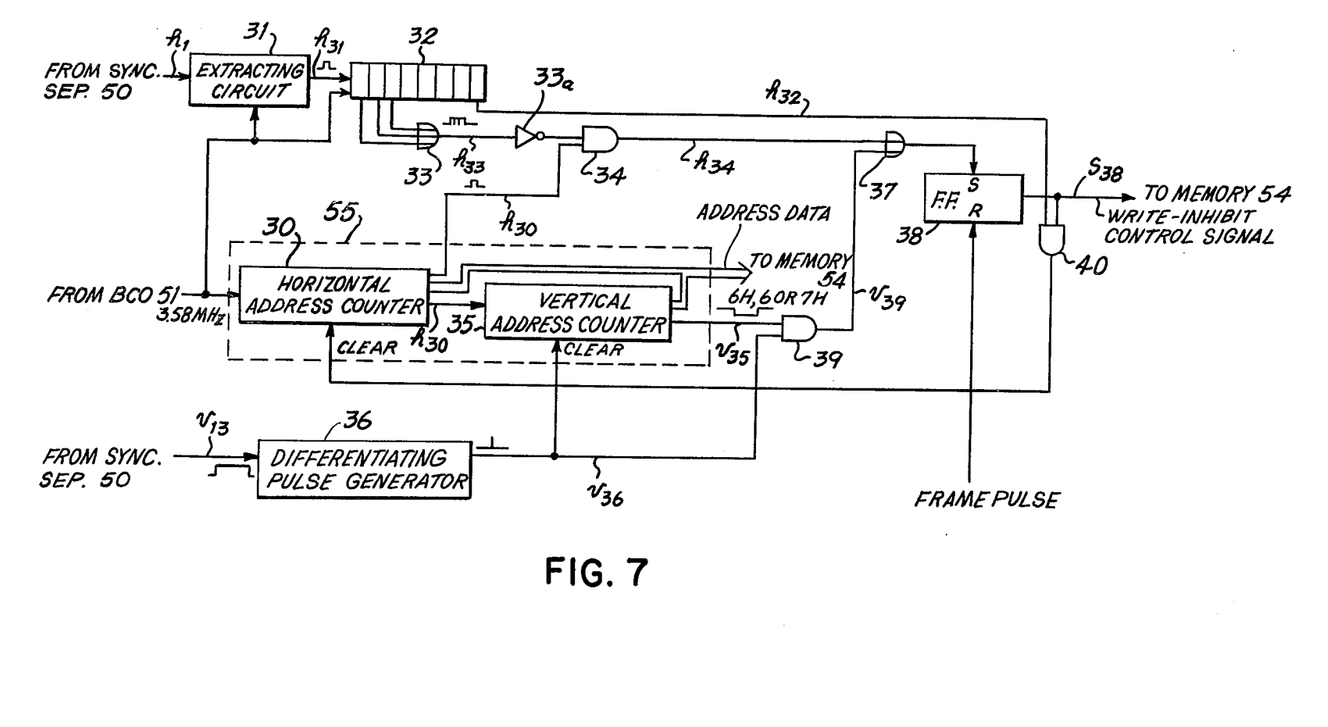
FIG. 7 is a block diagram illustrating another embodiment of the invention.

In the modification shown in FIG. 7, the write address generator 55 has a horizontal address counter 30 and a vertical address counter 35. The output of the BCO51 having the subcarrier frequency is applied and the horizontal address counter 30 provides, in addition to the horizontal address and the self-clear pulse $h'_{30}$ supplied to the vertical address counter 35, a pulse $h_{30}$ which has a width equal to one subcarrier period (280 nanoseconds) and is advanced in phase by six subcarrier periods with respect to the self-clear pulse $h'_{30}$. The vertical address counter 35 provides, in addition to the vertical address, a window pulse $v_{35}$ having a width of six or seven horizontal periods with a vertical clear pulse positioned approximately at its center and with a negative polarity. The window pulse $v_{35}$ also serves as a memory blanking pulse for the vertical blanking period.

To detect the non-synchronous switching in response to the horizontal synchronizing pulse, a pulse $h_{31}$ of 280 nanoseconds in width beginning at the end of separated horizontal synchronizing pulse $h_1$ is produced at an extracting circuit 31. The extracting circuit 31 may be composed of an integrated circuit Model No. SN7474 manufactured and marketed by Texas Instruments Incorporated, which contains two D-Type flip-flop. The pulse $h_{31}$ from the extracting circuit 31 is supplied to a shift register 32. The signals derived from successive three stages of the shift register 32 are combined via an OR gate 33 into a window pulse $h_{33}$ having a width of three subcarrier periods. For this purpose, the output of the BCO51 equal in frequency to the subcarrier is supplied to the extracting circuit 31 and the shift register 32. The pulse $h_{33}$ is supplied through an inverter 33a to an AND gate 34, to which is applied the output pulse $h_{30}$ from the counter 30 also. The absence of the pulse $h_{30}$ within the width of the window pulse $h_{33}$ represents the detection of the non-synchronous switching, in which the output $h_{34}$ from the AND gate 34 sets a F.F. 38 through an OR gate 37.

The detection of the non-synchronous switching in response to the vertical synchronizing signal will now be described. The vertical synchronizing signal $v_{13}$ is differentiated at a differentiating pulse generator 36 into a pulse $v_{36}$ of a narrow width. The differentiated pulse $v_{36}$ coincides with the center of the vertical synchronizing signal $v_{13}$, and is applied together with the window pulse $v_{35}$ to an AND gate 39 to detect the non-synchronous switching. If the differentiated pulse $v_{36}$ does not fall within the period of the window pulse $v_{35}$, an output $v_{39}$ representing the detection of the non-synchronous switching is derived from the AND gate 39 to set the F.F. 38 through the OR gate 37. When set by the output from the OR gate 37, the F.F. 38 emits a write-inhibit control signal $S_{38}$ until it is reset by a subsequent frame pulse.

When the output $v_{39}$ representative of the detection of the non-synchronous switching is provided, the counters 30 and 35 must be synchronized with the new input television signal. For this purpose, the horizontal address counter 30 is cleared by the output of the AND gate 40 to which the output $S_{38}$ and the pulse $h_{32}$ are supplied from the F.F. 38 and the shift register 32, which gives a six-subcarrier-period delay to the pulse $h_{31}$ with respect to the center of the window pulse $h_{33}$. On the other hand, the vertical address counter 35 is cleared by the differentiated pulse $v_{36}$. It will be noted that the circuit shown in FIG. 7 markedly simplifies the embodiment shown in FIG. 3.

Figure 2:
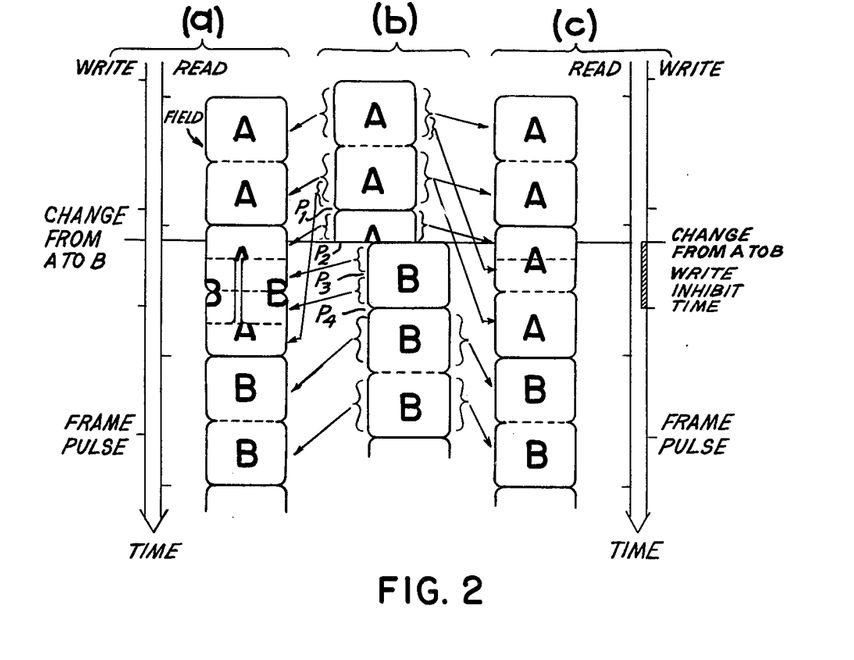
FIG. 2 schematically shows the relation between the input television signal and the output television signal in a frame synchronizer, FIG. 2(a) illustrating the non-synchronous switching for the input television signals, FIG. 2(b) illustrating an output television signal affected by the non-synchronous switching, and FIG. 2(c) illustrating an output television signal obtained in a frame synchronizer according to the present invention.
Figure 8:
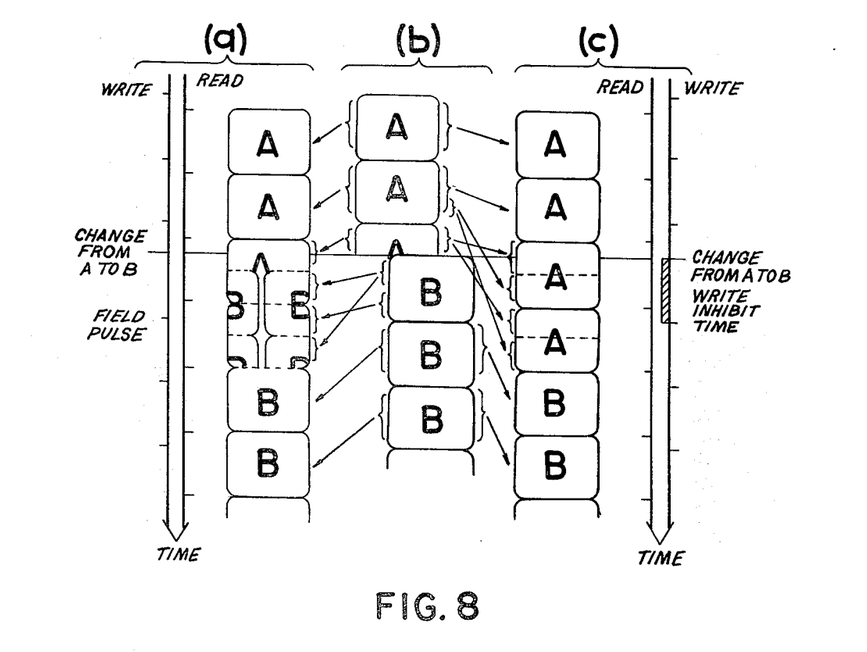
FIG. 8 is a schematic illustration similar to that of FIG. 2 of the output video signal for a field-type frame synchronizer to which the present invention is applied.

It has been assumed in the foregoing description that the memory 54 employed in the embodiment is a frame memory having a capacity sufficient for one frame portion of the input television signal. The memory 54 may also be made of a field memory as in the case of the field-type frame synchronizers on the market. The write-inhibit of the field memory for such a case would cover the time period from the moment of the non-synchronous switching to the beginning of the immediately following field. The relationship between the input television signal and the output of the field-type frame synchronizer is shown in FIG. 8. As in the case of FIG. 2, FIG. 8(a) represents the input television signal; FIG. 8(b) represents, the output of the frame synchronizer without the write-inhibit operation applied; and FIG. 8(c) represents the output of the frame synchronizer to which the write-inhibit is applied to the field memory according to the present invention. In this modification, the F.F. 10 and F.F. 20 shown in FIG. 3 and the F.F. 38 shown in FIG. 7 are reset by the field pulse ($S_2$ in FIG. 1) derived from the vertical synchronizing signal.

What is claimed is:

1. A frame synchronizer including means for digitizing an input television signal, a memory for storing the digitized television signal, write-in address generator means for generating address signals to write the digitized television signal in said memory in accordance with a scanning sequence of the input television signal, read-out address generator means for generating address signals to read the digitized television signal out of said memory in accordance with a reference signal, means for converting the signal read out of said memory into an analog signal, and means for producing a write-inhibit signal to inhibit the write-in of said digitized television signal into said memory, said write-inhibit signal producing means comprising first means responsive to one of the synchronizing pulses contained in said input television signal for generating a first pulse disposed at a time position before the time position of the synchronizing pulse immediately following said one synchronizing pulse;

a flip-flop adapted to be set by the leading edge of said first pulse and to be reset by said synchronizing pulses of said input television signal;

second means responsive to the trailing edge of said first pulse for generating a second pulse having a narrower pulse width than said first pulse; and third means responsive to said second pulse and said set state of said flip-flop for providing an output as said write-inhibit signal.

2. A frame synchronizer including means for digitizing an input television signal, a memory for storing the digitized television signal, means for generating address signals to write the digitized television signal in said memory in accordance with a scanning sequence of the input television signal, means for generating address signals to read the digitized television signal out of said memory in accordance with a reference signal, and means for converting the signal read out of said memory into an analog signal, a write-inhibit control circuit for producing a write-inhibit signal to inhibit the write-in of said digitized television signal in said memory, said write-inhibit control circuit comprising means for generating a first pulse having a predetermined pulse width when the address signal generated by said write-in address generator means designates a predetermined address;

means responsive to a synchronizing signal contained in said input television signal for generating a second pulse having a predetermined pulse width; and means responsive to said first pulse and said second pulse for providing a pulse output as said write-inhibit signal.

3. The frame synchronizer of claim 1, in which said third responsive means comprises a gate receiving said second pulse and the output of said flip-flop, and a second flip-flop having a set terminal coupled to the output of said gate, the output of said second flip-flop being said write-inhibit signal.

4. The frame synchronizer of claim 1, in which said first pulse signal generating means comprises a first multivibrator receiving a synchronizing pulse, a counter receiving count signals coupled to the output of said first multivibrator, a gate coupled to the outputs of said first multivibrator and said counter, and a second multivibrator coupled to the output of said gate.

5. A frame synchronizer including means for digitizing an input television signal, a memory for storing the digitized television signal, means for generating address signals to write the digitized television signal in said memory in accordance with a scanning sequence of the input television signal, means for generating address signals to read the digitized television signal out of said memory in accordance with a reference signal, means for converting the signal read out of said memory into an analog signal, and means for producing a write-inhibit signal to inhibit the write-in of said digitized television signal in said memory, said write-inhibit signal producing means comprising, means for producing a first control signal upon the detection of nonsynchronous switching in response to a horizontal synchronizing signal contained in said input television signal, means for producing a second control signal upon the detection of nonsynchronous switching in response to a vertical synchronizing signal contained in said input television signal, and gating means for applying one of said first and second control signals to said memory as said write-inhibit control signal.

* * * * *

UNITED STATES PATENT AND TRADEMARK OFFICE
CERTIFICATE OF CORRECTION

PATENT NO. : 4,231,063
DATED : October 28, 1980
INVENTOR(S) : Yutaka Ito et al.

It is certified that error appears in the above—identified patent and that said Letters Patent is hereby corrected as shown below:

On the title page, Assignee should read:

-- Assignee: Tokyo Broadcasting System, Inc. and Nippon Electric Co., Ltd. --.

Signed and Sealed this

Sixteenth Day of March 1982

[SEAL]

Attest:

GERALD J. MOSSINGHOFF

Attesting Officer

Commissioner of Patents and Trademarks